June 15, 1937.  C. A. CAMPBELL  2,083,686
AIR BRAKE
Filed Jan. 6, 1936
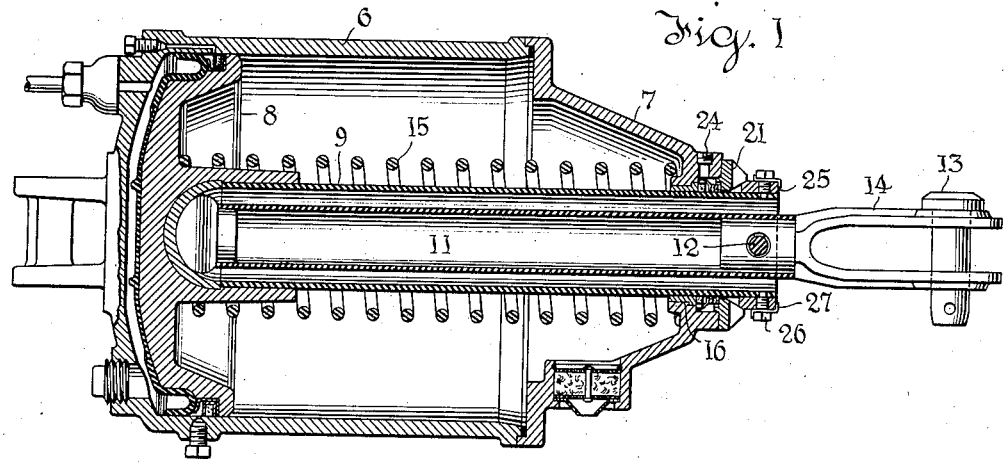
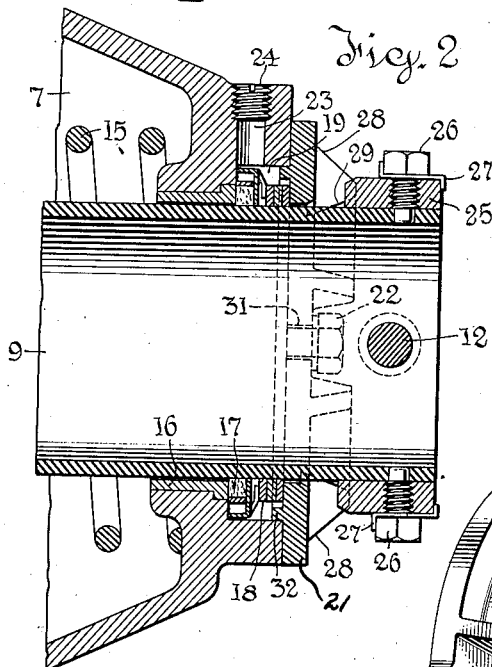
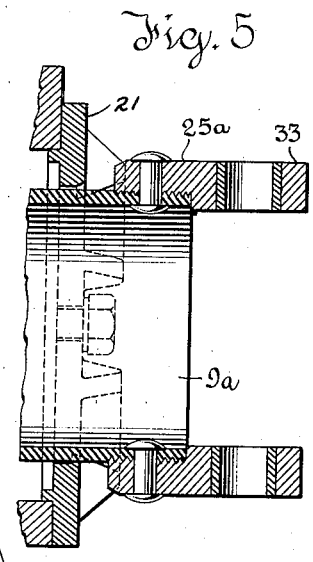
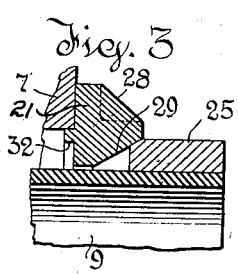
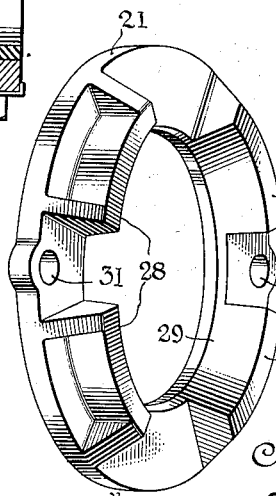
Inventor
Charles A. Campbell
Attorneys Patented June 15, 1937

2,083,686

UNITED STATES PATENT OFFICE 2,083,686

AIR BRAKE

Charles A. Campbell, Watertown, N. Y., assignor to The New York Air Brake Company, a corporation of New Jersey Application January 6, 1936, Serial No. 57,828

3 Claims. (Cl. 308—4)

This invention relates to brake cylinders for fluid pressure railway brakes, and particularly to the means for supporting and guiding the tubular piston rod customarily used in such brakes.

The present trend in the art is toward mounting the brake cylinders directly on the trucks, instead of mounting them on the car frame as was formerly the accepted practice. The tubular piston rod necessarily makes a loose fit in its guide which guide is carried by the front cylinder head (called in the art the "non-pressure head").

The present invention provides means effective in release position to center the tubular piston rod so that it cannot vibrate and cause wear. Such wear has been found to be severe where the cylinder is mounted on the truck because of the intense vibration encountered.

The invention takes advantage of the return spring to develop the centering force, and in its preferred form the centering device is carried by the retaining ring for the lubricating and dust excluding parts mounted in the piston rod guide.

The invention is illustrated in detail in the accompanying drawing wherein,—

Fig. 1 is an axial section through a brake cylinder showing one embodiment of this invention.

Fig. 2 is an enlarged view of a portion of Fig. 1 with the push rod omitted.

Fig. 3 is a fragmentary sectional view similar to a portion of Fig. 2 the section being taken on a different plane for the purpose of showing the manner in which the opposed inclined faces of the centering means engage.

Fig. 4 is a perspective view of the retaining and centering ring.

Fig. 5 is a view in section showing the application of this invention to a clevis type piston rod.

Referring to Figs. 1 to 4, the numeral 6 designates the body of a known type of brake cylinder. 7 is the front or non-pressure head end of the cylinder, 8 is the piston head, and 9 is the tubular piston rod which receives the usual push rod 11.

The push rod 11 is retained within the tubular piston rod by a pin 12 which works loosely in a hole and is connected in the usual way to the brake rigging (not shown) by the pin 13 and clevis 14. Return spring 15 urges the piston 8 toward release position.

At its outer end the tubular piston rod passes loosely through, and is guided by, a bushing 16 fixed in the non-pressure head 7. At the outer end of this bushing is a lubricating ring 17, and a plurality of wiper or dust-excluding rings 18. They are confined within a recess 19 by a retaining plate 21 held by cap screws 22. Lubricant is supplied to this assembly through opening 23 closed by a threaded plug 24.

A collar 25 is secured to the end of piston rod 9 by pilot screws 26 provided with lock washers 27.

The parts so far described will be recognized as a known type of brake cylinder and no novelty is here claimed therefor.

According to this invention the retaining ring 21 is provided with a plurality of arcuate bosses 28 formed on its outer face. The inner faces 29 of the bosses 28 flare outward, see particularly Fig. 4. Cap screws 22 pass through openings 31 and secure the ring to the head 7.

The inner face of the ring 21 is formed with an annular rib 32 which enters the recess 19 and centers the ring.

By this arrangement the rib 32 resists all side thrust of the piston rod and consequently relieves the cap screws of shearing stress.

The collar 25 has one edge beveled to mate with the flared faces 29 of bosses 28.

The arrangement shown in Fig. 5 is similar to that just described but applied to a brake cylinder whose piston is of the clevis type.

As shown the collar 25a is threaded upon the end of piston rod 9a and riveted thereto. Further it is provided with arms 33 having openings which receive the usual pin.

With either arrangement the operation is as follows:

Upon release of pressure in the brake cylinder the piston head 8 is moved toward release position by the return spring 15. As it aproaches, but before it reaches its limit of motion, collar 25 contacts bosses 28 and terminates inward movement of the piston.

The inclined or flared faces 29 coact with the collar 25 to center the piston rod, and the expansive effort of return spring 15 acting upon the piston effectively prevents any motion of the piston stem while the brakes are released.

While the invention has been described in some detail it will be apparent to those familiar with the art that it is readily adaptable to the various known forms of brake cylinders, and no necessary limitation to the disclosed form is implied.

What is claimed is,—

1. The combination of a brake cylinder; a piston having a piston rod; a combined lubricating and dust excluding means carried by said brake cylinder; a retainer ring for said lubricating and dust excluding means, said retainer ring having beveled surfaces on one face thereof; a collar carried by said piston rod, said collar having a beveled face adapted to coact with the beveled faces of said retainer ring; and a spring rendering said coaction effective to center and confine said piston rod against vibration as the rod approaches its limit of motion toward release position.

2. The combination of a brake cylinder having a piston rod guide; a piston working in said cylinder and having a rod working freely in said guide; a spring urging said piston toward release position; beveled surfaces on said guide and on said rod, said beveled faces coacting to center and confine said rod against vibration as said piston nears its limit of motion toward release position.

3. In a fluid pressure brake, the combination of a cylinder unit; a coacting piston unit having a part freely guided in the cylinder unit; a spring reacting between said units and urging them toward release position; and wedging means rendered effective by said spring in said release position, to hold said units against relative vibratory movement.

CHARLES A. CAMPBELL.